April 21, 1953 A. B. ARONS ET AL 2,636,134
PIEZOELECTRIC PRESSURE GAUGE ELEMENT
Filed Oct. 1, 1947

INVENTORS:
ARNOLD B. ARONS
CLIFFORD FRONDEL
BY M. O. Hayes
ATTORNEY

Patented Apr. 21, 1953

2,636,134

UNITED STATES PATENT OFFICE 2,636,134

PIEZOELECTRIC PRESSURE GAUGE ELEMENT

Arnold B. Arons and Clifford Frondel, Woods Hole, Mass., assignors to the United States of America as represented by the Secretary of the Navy Application October 1, 1947, Serial No. 777,136

13 Claims. (Cl. 310—8.7)

This invention is concerned with the measurement of transient pressure waves in fluid medium. More particularly, the invention relates to a piezoelectric gauge element of the type employing tourmaline discs which are adapted to develop electrical charges upon exposure to mechanical stress.

In one specific aspect, the invention deals with the measurement of transient pressure waves generated by underwater explosions. It has been found that due to certain limitations inherent in the natural characteristics of tourmaline, the most satisfactory results are obtained by employing a plurality of thin tourmaline discs mounted in piled relation. The diameter of the discs is dependent to a considerable extent upon the type of medium in which the piezoelectric gauge is to be utilized. This is explained by the fact that the transit time of any given element of a shock wave across the gauge element must be small relative to duration of the wave, in order for the gauge element to reproduce a pressure curve faithfully. Such transit time of the shock wave varies with different mediums. In air the duration of the shock wave is relatively long, owing to the fact that the air is highly compressible; whereas, in water the duration of the shock wave is relatively shorter because the water is relatively less compressible. Thus, it has been found that in air, tourmaline gauge elements may be used successfully, having diameters running from 7/8 of an inch to 1 3/4 inches. On the other hand, it has been found that diameters of 1/4 of an inch to 1/2 of an inch yield satisfactory results in water. By way of specific examples, in order that the maximum pressure may be recorded to within at least 5%, the maximum element diameter is 1/2 inch for charges of high explosives of 100 to 500 lbs., and for charges under 50 lbs., it is necessary to use a 1/4-in. disc diameter.

It is appreciably more difficult to handle these relatively smaller discs of tourmaline. This is the case especially in electrically connecting them together in a pile by means utilized for air blast gauges. For example, it has been customary in air gauges to mount a pair of tourmaline discs at either side of a conductor plate with suitable electrode means provided at the faces of the discs. In order to prevent short circuits from being formed between adjacent discs, it has also been the custom to wind an insulating strip of rubber or other dielectric material in overlapping relation around the peripheral edges of the discs. Thereafter, a fine copper screen, which acts as an electrical shielding element and as a conductor, is superimposed on the insulation and suitably connected to the electrode surface at the top and bottom of the pile. The operation of assembling discs and joining the screen to the electrode surfaces by means of heat has been found to be difficult in the small disc diameters noted. Moreover, there is a definite tendency for the heating operation to affect the efficiency of the discs.

An object of the invention, therefore, is to provide an improved piezoelectric gauge element which is particularly adapted for use in measuring and underwater pressure waves and in which relatively small diameter tourmaline discs are employed. It is also an object of the invention to devise means of overcoming difficulties in assembling such small diameter disc gauge elements and in developing satisfactory efficiency of manufacture. Other objects will appear in the following description.

We have found that improved results may be obtained by eliminating the strip of insulating material and the step of winding it around the disc peripheries. We also find we can avoid the use of the cumbersome metal screen used for shielding, together with the disadvantage attendant upon welding such a member to electrode surfaces of the discs. In place of the strip of insulating material, we substitute a coating of a special type of polymerizable substance having high dielectric properties. An an electrical shielding and conductor means, we have succeeded in utilizing a metal film or layer which is very easily applied without heating excessively.

Figure 1:
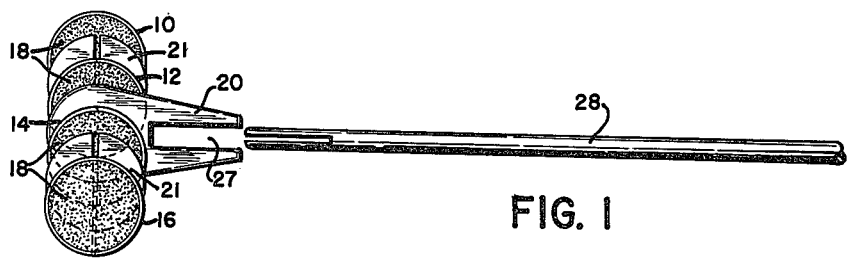
Fig. 1 is an exploded view showing a set of tourmaline discs and other component parts of our improved gauge element.

Considering the invention in greater detail, attention is directed to Fig. 1 in which is illustrated a number of tourmaline discs 10, 12, 14, 16, each of which has opposite faces coated with an electrode-forming material 18, applied in a manner such that the peripheral edges of the discs are at all points left uncovered.

The operation of coating the discs is conveniently carried out by brushing on a liquid consisting of a conductive silver compound. The coated discs are supported at their peripheral edges and baked in a muffle furnace, at a temperature of 550° C., for example, for a period of approximately one hour.

We find that with thin discs, having relatively small diameters such as from ¼ of an inch up to ½ an inch, the treatment outlined permits the discs to be sweated together and thereby produce a satisfactory bonding of the discs to one another. At the same time, the silver compound serves as an adequate electrode material at the several disc surfaces, a features which is necessary to conduct charges which may be induced in the discs under mechanical stress.

After the discs have been plated with the silver compound, they are burnished with steel wool or a fine wire brush. They are then tested for the necessary high resistance between the two electrode surfaces. A resistance of over 1,000 megohms is satisfactory in most instances. The polarity of the surfaces is determined, for example, by testing on a piezometer in which voltage is produced by squeezing a disc under a small lever arm and impressed on the grid of a high-gain amplifier tube. A negative charge impressed on the grid will decrease, and a positive charge will increase, the plate current. A milliammeter in the plate circuit of the tube permits visual inspection of the polarity. A similar test is more easily performed by coupling the observed voltage to the vertical amplifier input of a sensitive oscilloscope and observing the direction of deflection of the trace.

Figure 2:
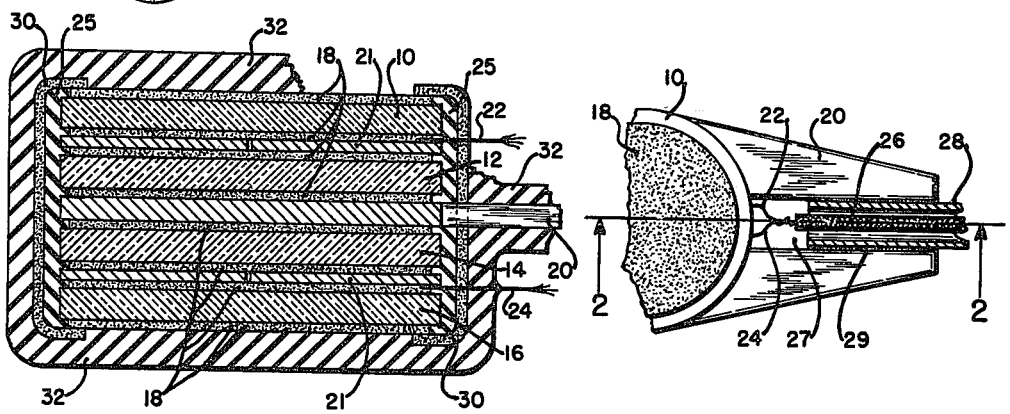
Fig. 2 is an enlarged cross-sectional view of an assembled gauge element utilizing the components shown in Fig. 1.
Figure 3:
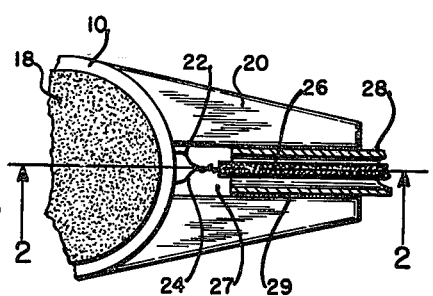
Fig. 3 is a detail plan view showing the gauge element of the invention attached to a cable member.

With reference now to Figs. 2 and 3 which illustrate an assembled gauge element and to the exploded view of Fig. 1, there is provided a central metal plate 20 which may, for example, have a thickness of 0.005 of an inch for ¼-inch diameter disc. To this central plate are secured the pairs of coated discs 10 and 12, and 14 and 16. Conductor elements 22 and 24 may consist of short lengths of multi-strand silver, copper, or steel wire of, for example, 0.005-inch diameter. The ends of these short lengths of wire are frayed out into a fan shape. The end of wire 22, as shown in the drawings, is inserted between discs 10 and 12 while the end of wire 24 is inserted between discs 14 and 16. The two pairs of discs, with their respective wires, are then arranged in a pile at either side of the plate 20, as is most clearly indicated in Fig. 2 of the drawings.

The assembly is made with thin discs 21 of sheet silver (of the order of 0.002 inch thick) at the interfaces of disc pairs 10 and 12, and 14 and 16 respectively. The silver discs have the same diameter as that of the crystals in the pile and are preferably cut in half along a diameter as shown in Figs. 1 and 2 to prevent splitting of the crystal upon subsequent cooling. The plate assembly is firmly held in a spring clamp and baked in an oven at a temperature of about 550° C. At this temperature, the silver sheets form a firm bond with the previously applied electrode material.

An alternative method is to use thin sheets of solder at each interface in place of silver. The necessary solder sheets can be made by dropping molten solder on a flat surface, for example, a table top, and cutting out discs of appropriate diameter from the sheets so formed. When using solder, care must be taken to use no more than necessary since, upon heating, excess solder flows out from between the edges and causes short circuits at the periphery. Also, the heating should not be carried beyond the melting temperature of the solder since at higher temperatures the solder rapidly dissolves the silver electrodes.

The pile of discs and plate are, in assembly, next coated along the peripheral edges with a polymerizable insulating material consisting of a thin film 25 of liquid natural rubber latex, a suitable example of which is a latex containing 60 to 65 per cent natural solids. Thereafter, the coated unit is again baked at 110° C. until the latex is cured and has been changed into a tough transparent polymer. A heating period of approximately ninety minutes provides suitable curing.

The central plate 20 is formed with a slot 27 which is adapted to receive a copper tube 28 electrically connected to the plate by soldering as at region 29. The copper tube carries a cable 26 to which are connected wires 22 and 24 as indicated in Fig. 3 of the drawings. The gauge element thus assembled is provided with electrical shielding and means for electrically connecting the two outside electrode surfaces of the top and bottom tourmaline discs. The shielding consists of a coating 30 of liquid silver which is superimposed over the insulation and extends into contact with electrode material 18 on discs 10 and 16 and into contact with the plate 20 which, in turn, makes contact with electrode material 18 on the discs 12 and 14, thus furnishing electrical continuity.

The entire gauge element assembly is then provided with a waterproof coating 32. This is satisfactorily done by dipping into a melted mass of a substance such as a wax. The gauge element is preferably dipped up to the point where the steel plate 20 is soldered to the tubing 28, and it is found that four or five dippings may be necessary to build up a coating having a thickness of $\tfrac{1}{16}$ of an inch. A final coat (not shown) of a plastic or semi-plastic material may be added to protect the waterprof coating 32 from mechanical injury.

We have found that the natural latex compound has the ability to bond satisfactorily with the peripheral edges of the tourmaline discs and to remain in contact under the conditions to which such gauge elements are subjected. Moreover, the latex combines this peculiar binding power with a high dielectric character. Various other synthetic rubbers and similar substances, although capable of equaling or surpassing the latex in one of these respects, nevertheless were found to be unable to meet both requirements. There is also the further ability of the latex to receive and hold to the coating of silver which constitutes the shielding and conductor surface in place of a screen. The silver compound itself has shown ability to withstand the conditions of gauge work without peeling or cracking as is encountered in the case of many other substances which have been tried.

Figure 4:
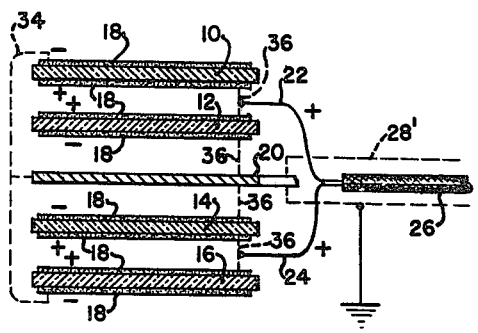
Fig. 4 is a diagrammatic view indicating the electrical circuits in the gauge element of Fig. 3.

In Fig. 4, we have indicated diagrammatically the gauge element in an expanded position to indicate the polarity of charges and the electrical paths through which they are carried to a device such as an oscilloscope on which fluctuation from shock wave pressure may be observed.

For clarity, only discs 10, 12, 14, and 16, and plate 20 are shown in Fig. 4. Dashed line 34 schematically represents the electrical connection afforded by coating 30. Dashed lines 36 represent the electrical connections afforded by contact of discs 10 and 12 with one disc 21, by contact of discs 14 and 16 with the other disc 21, and between discs 12 and 14 and plate 20. Dashed line 28' schematically represents the connection afforded by tube 28. In the preferred embodiment of the invention, connection 28' is preferably maintained at ground potential. Conductor 26 represents the correspondingly numbered element in Fig. 3. It should be noted that, in this embodiment of the invention shown in Fig. 4, discs 10, 12, 14, and 16, all have their negative side (as indicated by the minus sign in Fig. 4) connected to plate 20 and their positive side, as indicated by the plus sign, connected to the conductor 26. Thus, discs 10, 12, 14, and 16 are connected in shunt. The particular arrangement shown in Fig. 4 is the so-called "single-ended" gauge design, which is well adapted for use with a coaxial or shielded single conductor connecting line.

Figure 5:
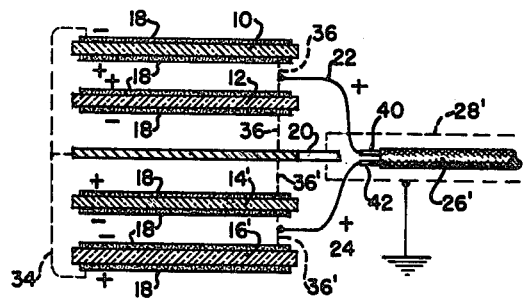
Fig. 5 is a second diagrammatic view showing the electrical circuits in a modified form of the invention.

Fig. 5 illustrates an alternative arrangement for providing a gauge of the so-called "push-pull" type. In Fig. 5, dashed line 34 again represents the electrical connection afforded by coating 30 of Fig. 2. Discs 10 and 12, plate 20, and conductors 22 and 24 correspond to similarly numbered elements in Fig. 4. Dashed lines 36 and 28' represent the electrical connections afforded by similarly numbered lines in Fig. 4. Discs 14' and 16' of Fig. 5 are in all respects identical to discs 14 and 16 of Fig. 4. However, discs 14' and 16' are so positioned that their negative electrodes are adjacent each other. Thus, in this embodiment of the invention, the positive electrode of disc 14' contacts plate 20, while the positive electrode of disc 16' contacts coating 30. These last-named connections are represented by dashed lines 36' of Fig. 5. When the gauge element of Fig. 5 is subjected to an increase in pressure, the potential of conductor 22 will become positive with respect to plate 30, while conductor 24 will become negative with respect to plate 20. It is necessary, therefore, to provide a two-conductor cable 26' for making connection to the gauge element. Conductor 22 is attached to one conductor 40 of cable 26', while conductor 24 is attached to the second conductor 42 of this cable. Tube 28, represented by dashed line 28', again provides means for making electrical connection to plate 20. It will usually be desirable to ground tube 28 so that this tube acts as a shield. The "push-pull" type gauge has the advantage that it is balanced with respect to ground, hence, much of the spurious cable signal is cancelled in the output circuit.

Various other changes may be resorted to; and it should also be understood that the field of application of gauge elements of this sort is not limited to underwater operations. These devices may be employed to measure transient pressure waves in air and other fluid mediums, and the pressure source need not be explosive in character.

We claim:

1. A piezoelectric gauge element for measuring transient pressure waves, comprising a pile of tourmaline discs mounted at either side of a supporting plate, a tubular member electrically connected to the plate, a conductor disposed internally of and insulated from said tubular member, said tourmaline discs having electrode elements interposed between adjacent discs, the top and bottom exposed faces of the discs and the faces lying in contact with the said supporting plate being at ground potential, while the intermediate pairs of electrode faces are connected to said conductor, the peripheral edges of said discs being covered with a layer of insulating material consisting of vulcanized latex, and electrical shielding means consisting of a film of an electrically conductive silver compound which overlies the said latex layer and extends into contact with the said electrode elements occurring at the top and bottom faces of the pile of discs.

2. A piezoelectric gauge element for measuring transient pressure waves comprising a pile of tourmaline discs mounted at either side of a supporting plate, said discs being provided with a heat-treated liquid silver electrode on each face thereof, said electrodes on the innermost discs in said pile being disposed in electrical contact with said supporting plate, connector means electrically joined to electrodes disposed at the interface of each pair of discs, the peripheral edges of said discs being covered with a layer of insulating material consisting of vulcanized latex, electrical shielding means consisting of a film of electrically conductive silver compound which overlies the said latex layer and extends into contact with said electrode elements occurring at the top and bottom exposed faces of said pile and into contact with said plate.

3. A gauge element as claimed in claim 2, said gauge element further comprising a conductive tubular member electrically connected to said plate and a conductor disposed internally of and insulated from said tubular member, said conductor being electrically joined to said connector means, whereby said conductor and said tubular member provide connecting means for said gauge element.

4. A gauge element as claimed in claim 2, said gauge element further comprising a conductive tubular member electrically connected to said plate and a first and a second conductor disposed internally of and insulated from said tubular member, said first conductor being electrically joined to selected ones of said connector means, said second conductor being connected to other said connector means, whereby said first and second conductor and said tubular member cooperate to provide an electrically balanced output connection.

5. A method of electrically shielding piezoelectric gauge elements including the steps of coating a selected portion of the surface of said gauge element with a polymerizable material, subjecting said coated gauge element to prolonged heating to cure said coating, and overlaying said cured coating with a film of electrically conductive silver compound.

6. A method of electrically shielding piezoelectric gauge elements including the steps of coating a selected portion of the surface of said gauge element with a film of liquid natural rubber latex, curing said film, overlaying said film with a second film of electrically conductive silver compound, and coating the entire surface of said gauge element with a third film of waterproofing material.

7. A method of assembling piezoelectric gauge elements of the type comprising a plurality of relatively thin discs disposed in a piled relationship including the steps of coating the faces of the discs with a liquid silver compound, heat treating the coated discs, burnishing the coated discs, assembling the discs and supporting means and spacing means therefor in a piled relationship, inserting connector means at the interfaces of selected disc pairs, applying a compressive stress to said pile, heating said pile while subjected to said compressive stress to mechanically and electrically bond the elements of said pile, applying a coating of a polymerizable material to the peripheral surface of said pile, curing said coating, overlaying said cured coating with a film of electrically conductive silver compound, and coating the entire outer surface of said gauge element with a film of waterproofing material.

8. A method of electrically shielding piezoelectric gauge elements including the steps of coating a selected portion of the surface of said gauge element with a film of liquid natural rubber latex, curing said film, and overlaying said cured film with a second film of electrically conductive silver compound.

9. A method of assembling piezoelectric elements of the type comprising a plurality of relatively thin piezoelectric discs disposed in a piled relationship including the steps of coating the faces of the discs with a liquid silver compound, heat treating the coated discs, burnishing the coated discs, assembling the discs and metallic wafers alternately in a piled relationship, applying a compressive stress to said pile and heating said pile while subjected to said compressive stress to mechanically and electrically bond the elements of said pile.

10. A method of assembling piezoelectric elements of the type comprising a plurality of relatively thin discs disposed in a piled relationship including the steps of coating the faces of the discs with a liquid silver compound, heat treating the coated discs, assembling the discs and divided silver wafers alternately to form a pile, applying a compressive stress to said pile and heating said pile while subjected to said compressive stress to mechanically and electrically bond the elements of said pile.

11. A method of assembling piezoelectric elements of the type comprising a plurality of relatively thin circular tourmaline discs disposed in a piled relationship including the steps of coating the faces of the discs with a liquid silver compound, heat treating the coated discs, assembling the discs and thin circular silver wafers divided along a diameter alternately to form a pile, applying a compressive stress to said pile and heating said pile while subjected to said compressive stress to mechanically and electrically bond the elements of said pile.

12. A piezoelectric gauge element for measuring transient pressure waves comprising a plurality of piezoelectric discs, said discs being provided with a heat treated liquid silver electrode at each face thereof, a supporting plate, and a plurality of conductive wafers, said discs, said supporting plate and said wafers being joined in a pile by said electrodes.

13. A piezoelectric gauge element for measuring transient pressure waves comprising a plurality of tourmaline discs, said discs being provided with a heat treated liquid silver electrode at each face thereof, a supporting plate and a plurality of conductive wafers, said discs, said supporting plate and said wafers being joined in a pile by said electrodes, the peripheral edges of said discs being covered with a layer of insulating material consisting of a cured polymer and electrical shielding means consisting of a film of electrically conductive silver compound which overlies the said insulating layer.

ARNOLD B. ARONS.
CLIFFORD FRONDEL.

References Cited in the file of this patent
UNITED STATES PATENTS

| Number | Name | Date |
|---|---|---|
| 2,167,254 | Skellett | July 25, 1939 |
| 2,266,333 | Ream | Dec. 16, 1941 |
| 2,325,238 | Flint | July 27, 1943 |
| 2,434,143 | Chilowsky | Jan. 6, 1948 |
| 2,456,995 | Robinson | Dec. 21, 1948 |